United States Patent [19]

Aldcroft et al.

[11] Patent Number: 5,326,395
[45] Date of Patent: Jul. 5, 1994

[54] SILICA PRODUCTS

[75] Inventors: Derek Aldcroft, Great Sutton; Ian P. McKeown, Liverpool; Bryan Rogers, Warrington; Peter W. Stanier, Cheshire, all of Great Britain

[73] Assignee: Unilever Patent Holdings B.V., Netherlands

[21] Appl. No.: 971,615

[22] Filed: Nov. 6, 1992
(Under 37 CFR 1.47)

[30] Foreign Application Priority Data

Nov. 7, 1991 [EP] European Pat. Off. ........ 91310327.1

[51] Int. Cl.$^5$ ................................. C09D 4/00
[52] U.S. Cl. ..................... 106/502; 106/272; 106/482
[58] Field of Search ............... 106/272, 491, 502, 482

[56] References Cited

U.S. PATENT DOCUMENTS

| 3,816,154 | 6/1974 | Baldyga et al. | 106/502 X |
| 4,097,302 | 6/1978 | Cohen et al. | 106/272 X |
| 5,034,207 | 7/1991 | Kerner et al. | 423/339 |
| 5,074,918 | 12/1991 | Bäbler | 106/493 |
| 5,087,594 | 2/1992 | Kato et al. | 501/97 |
| 5,123,964 | 6/1992 | Kerner et al. | 106/287.34 |

FOREIGN PATENT DOCUMENTS 0341383 2/1989 European Pat. Off. .
798621 7/1958 United Kingdom .

Primary Examiner—Karl Group
Assistant Examiner—Chris Gallo
Attorney, Agent, or Firm—Cushman, Darby & Cushman

[57] ABSTRACT

A silica matting agent has a wax coating comprising a mixture of three waxes, i.e. hard microcrystalline, plasticising monocrystalline and synthetic polyethylene. The use of this ternary mixture gives the matting agent improved interaction with lacquers and improved sedimentation.

10 Claims, No Drawings

SILICA PRODUCTS

FIELD OF INVENTION

The invention relates to wax coated silica matting agents which are widely used in the surface coatings industry to reduce gloss but also to enhance film properties such as feel, scratch resistance and flexibility.

BACKGROUND TO THE INVENTION

It is well known that micronised waxes will impart these desirable features to the paint or lacquer film. However, when a silica is coated/impregnated with the wax a process usually performed by jointly grinding the silica and wax in a fluid energy mill (microniser), further product benefits are immediately available. The mixed phenomenon of coating and impregnating, resulting from the inherent porosity of the silica, is hereinafter referred to as "coating". The wax can improve compatibility of the silica with the paint or lacquer preventing interaction with other components in the formulation, but another function is to prevent the formation of hard sediment during storage which is not redispersible. Whilst the mechanism by which this protection is afforded is still not fully understood, its benefit to the paint or lacquer manufacturer is widely recognised because, if hard sediments which cannot be redispersed are formed, none of the benefits described above can be realised.

LITERATURE

Two types of wax coated silicas are generally disclosed in the literature. GB 798,621 (Grace) discloses a silica matting agent produced by co-milling an intermediate density silica gel with a microcrystalline wax in a fluid energy mill. GB 1,236,775 teaches a silica matting agent can be prepared by treating precipitated silica with an aqueous emulsion or dispersion of a wax, including thermoplastic materials. The properties of the silica matting agents prepared by the so-called "dry" co-micronising route have been further improved by adding fatty acids (GB 1,461,511 - Grace) or synthetic polyethylene waxes of varying molecular weight (U.S. Pat. No. 4,097,302—SCM) to the microcrystalline wax before feeding to the fluid energy mill. The former improves the dispersibility of the wax coated products, whereas the latter shows products having enhanced settlement characteristics compared with commercially available materials can be prepared. The "dry" processing routes described above use temperatures in excess of the melting points of the waxes or wax blends whereas GB 1,538,474 (BASF) discloses a process which can produce satisfactory wax coated silicas at micronising temperatures of below 50° C., where functional waxes such as montan acid ester are employed.

GENERAL DESCRIPTION OF THE INVENTION

The general trend in the paint and lacquer industry to shorter mixing/cycle times by the use of higher shear and/or ultra sonic dispersing equipment makes it imperative that the wax coating on the silica is robust and more effective in preventing the formation of hard sediment on storage. In addition, the change to high solids systems demands the wax coated silica matting agent is more compatible with the active components in the paint or lacquer formulation. It would be desirable, therefore, to provide a wax coated silica for use as a general purpose matting agent which has enhanced capability of preventing the formation of hard sediment on storage and can lower the interaction between itself and the other components in the paint and lacquer formulation.

The invention proposes the use of a ternary blend comprising a hard microcrystalline wax, a plasticising microcrystalline wax, and a synthetic polyethylene wax for coating on to silica resulting in a product with an improved capability for preventing hard settlement in the paint or lacquer and which is more compatible with the other components in the formulation. Surprisingly, the amount of plasticising microcrystalline wax present in the blend plays the dominant role in determining whether the resulting wax coated silica exhibits the enhanced desirable features. Plasticising microcrystalline waxes have melting points in the range 70° to 85° C., a needle penetration (25° C.) of from 1.5 to 3.0 mm, and is exemplified by the grades Ultraflex ®, Victory ® and BeSquare ® 175 available from Petrolire. The hard microcrystalline waxes have melting points in the range 90° to 95° C., a needle penetration (25° C.) of from 0.4 to 0.8 mm and are typified by Crown ® 700 from Petrolite, Cerit ® HOT from Cerilite SA, Brazil and Lunacerin ® H193 from H. P. Fuller, Germany. The synthetic polyethylene wax has a melting point in the range 110° to 140° C., a molecular weight of 1000 to 4000, and is exemplified by the grades Polywax ® 1000 and Polywax ® 2000 available from Petrolite. The three wax components may each comprise mixtures of waxes satisfying the requirements of the component.

Accordingly the invention provides for an improved wax coated amorphous silica matting agent, characterised in that the wax coating consists of a ternary mixture comprising from about 5 to about 30% w/w, preferably from about 10 to about 20% w/w of a plasticising microcrystalline wax, from about 5 to about 20%, preferably from about 5 to 15% w/w of a synthetic polyethylene wax, and from about 50 to about 90% w/w, preferably from about 65 to about 85% w/w of hard microcrystalline wax. When the amorphous silica is a xerogel or precipitated silica the ternary wax coating will usually be present in an amount from about 5 to about. 20% w/w, preferably from about 5 to 15% w/w, in order to obtain the optimum effect. In these ranges the lower levels are sufficient to give the effect sought, whilst the upper levels give the desirable features but they are considered less cost effective.

The amorphous silica supporting the ternary wax coating has a surface area (SBET) to nitrogen from about 200 to about 550 $m^2g^{-1}$, and it is either a silica xerogel or a precipitated silica with a preferred pore volume between 0.8 to 2.5 $ccg^{-1}$.

The particle size distribution of the ternary wax coated amorphous silica will be commensurate with obtaining the necessary fineness of grind when dispersed in the paint or lacquer system, and the most effective reduction in gloss in the subsequently dried paint film. Consequently, the ternary wax coated amorphous silica has a weight mean particle size of from about 5 to about 9µm, with a 10 percentile of about 2µm to about 4µm and 90 percentile from about 9µm to about 20µm.

An essential feature of the invention is that the waxes are mixed together in the molten state, either spray cooled, or slabbed, and milled to a particle size range similar to the amorphous silica, before being milled jointly in the fluid energy mill. The inlet temperature of the air being supplied to the fluid energy mill must be high enough to ensure the ternary wax mixture melts within the residence time profile of the milling equipment.

TEST PROCEDURES i. Matting Efficiency

The matting efficiency of silica matting agent is determined by dispersing the silica in an alkyd urea lacquer, adding a catalyst, drawing a film on a black glass plate, curing in an oven and measuring the glossmeter readings using a BYK multi-glossmeter.

| Formulations | Parts by Weight |
|---|---|
| a) Alkyd urea lacquer (35% Solids) | |
| Butylated urea formaldehyde resin; BE660 (53%) | 40 |
| Castor oil modified alkyd of short to medium oil length BA548 (60%) | 30 |
| Xylene | 28 |
| Isopropyl alcohol | 14 |
| | 112 |
| Silicone Oil/Type AL (Wacker) | 1.12 |
| b) Acid Catalyst | |
| Butyl alcohol | 87 |
| Concentrated sulphuric acid | 11 |
| Distilled water | 2 |
| | 100 |
| c) Test Lacquer | |
| Alkyd urea lacquer (35%) | 100 |
| Acid catalyst | 5.2 |
| Silica matting agent | 1.46 |
| | 107.05 |

The test lacquer contains 1.37 % w/w of the silica matting agent.

Into a 250 ml beaker weigh 100 g alkyd urea lacquer (formulation(a)). Using a Heidolph stirrer (fitted with a Cowles-type head) stir the lacquer at 1000 rpm and add 5 g of the silica under test. When the silica completely wets out increase the stirrer speed to 3000 rpm (equivalent to a peripheral speed of 4.87 ms$^{-1}$) and stir for 10 minutes. Allow the dispersion to de-aerate, then weigh 6.5 g into a clean beaker followed by 15 g of the alkyd urea lacquer (formulation (a)), and then hand stir in 1.1 g of the acid catalyst. Draw down a film onto a black glass plate (12"×4") using a 100 μm block applicator, cure in an oven at 150° C. for 10 minutes, allow the plates to cool and then measure the glossmeter reading at 60° and 85° using a BYK multi-glossmeter.

ii. Fineness of Grind

The fineness of grind of a dispersed silica matting agent is measured in 35% solids alkyd urea lacquer with 0-50 micron Hegman Gauge. The result indicates the level of dispersion that can be achieved for a given silica matting agent. The same procedure is followed as for matting efficiency but 5 g of silica is dispersed in 100 g of alkyd urea lacquer (35% solids), equating to 4.76% w/w silica. The dispersion is then spread on a Hegman Gauge, viewed with the aid of a display cabinet, and the result recorded in microns.

iii. Accelerated Settlement at Temperature

To obtain information on settlement behaviour and the nature of particulate bed formed, matting agents are usually dispersed in a paint or lacquer at the required concentration and then stored in cans at room temperature. Over a period of weeks/months observations on settlement behaviour are recorded, and in particular the time taken for a hard sediment to form is noted. Even after storage for as long as 3 months it is difficult to discriminate performance of silicas coated with different waxes.

As a consequence an accelerated settlement behaviour test has been devised, by which a dispersion in alkyd urea lacquer prepared in exactly the same way as for matting efficiency, but containing 4.76% w/w silica, is transferred into sealed measuring cylinders and the measuring cylinders placed in a water bath at 70° C.

It is interesting to note the varying settlement behaviour of the silica matting agents containing different waxes, and relate this to the nature of the settled bed of particulates. Two extreme cases are observed. In one, the system appears to "flocculate" giving rise to a sediment layer which is thick and fluffy in appearance and the solvent layer is completely clear, whereas in the other flocculation is not apparent and the particulate layer is thinner and denser, and the solvent layer is cloudy immediately above the settled bed, changing to clear towards the surface of the vehicle. The interface between the sedimented particles and liquid is less marked in the latter case and can initially give the formulator a misleading stance as to the stability of the system. The true stabilisation performance is revealed on attempting to redisperse the bed of settled particles. In the "flocculated" case redispersion can be achieved by shaking or simple stirring whereas the sediment in the absence of flocculation is impossible to resuspend.

The time taken for the dispersed silica to settle to a hard sediment which will not resuspend is recorded. As the dispersions are stored at 70° C. the observations can now be made in days compared to weeks and months at room temperature, making it much easier to differentiate between the wax coated silicas in their propensity to prevent the formation of hard sediments.

iv. Weight Mean Particle Size

The weight mean particle size is determined with the aid of a Malvern Particle Size, Model 3600E. This instrument, made by Malvern Instruments, Malvern, Worcestershire uses the principle of Fraunhoffer diffraction utilising a low power He/Ne laser. Before measurement the sample is dispersed ultrasonically in water for a period of 7 minutes to form an aqueous suspension.

v. Surface Area/Pore Volume

Surface area is determined by standard nitrogen adsorption methods of Brunauer, Emmett and Teller (BET) using a multi point method with an ASAP 2400 apparatus supplied by Micromeritics of the USA. The samples are outgassed under vacuum at 270° C. for at least 1 hour before measurement. Surface area is calculated from the adsorption data measured in the P/Po range 0.05 to 0.3, and pore volume is calculated from the volume of nitrogen gas adsorbed at P/Po 0.98.

vi. Ignition Loss at 1000° C. (TVM)

Ignition loss is determined by the loss in weight of a silica when ignited in a furnace at 1000° C. to constant weight.

vii. Oil Absorption

Oil absorption is determined by the ASTM spatula rub-out method (American Society of Test Material Standards D 281).

The test is based on the principle of mixing linseed oil with a silica and rubbing with a spatula on a smooth surface until a stiff putty-like paste is formed which will not break or separate when it is cut with a spatula. From the volume of oil used the oil absorption, usually reported in g/100 g, can be calculated.

viii. Polyurethane Concentrate Gelling Test

To obtain information on the interaction of the wax coated silica products with the active components in a lacquer system it has been noted that the rheology of a polyurethane concentrate containing bentone is particularly sensitive to the "type" of silica matting agent dispersed in the concentrate. When an uncoated silica is used the system gels irreversibly within 4 hours whereas a totally hydrophobic silica has little effect on the concentrate. Thus, it would appear that this concentrate can be used to measure the level of the interaction between the components in the lacquer system and the silica matting agent.

| | Formulation |
|---|---|
| Bentone Paste | 100 g |
| Uralac AY694 × 60 | 250 g (a polyurethane obtainable from D. S. M. Resins Europe) |
| Xylene | 200 g |
| Silica | 150 g |

The silica was added to the lacquer in a 1 liter paint can and dispersed using a Cowles dissolver operating at 4000 rpm for 15 minutes. With the mixer operating at 2000 rpm a solvent mixture containing 240 g of xylene and 60 g of isobutylalcohol was added with care. The mixes containing the different coated silicas were allowed to stand at room temperature and examined for "seeding" and for "gelling". The time taken for the system to gel was recorded, and the shorter this time the greater the interaction between the components of the lacquer system and the silica matting agent. Formation of a gel prevents the lacquer being pourable and spreadable over a surface.

ix. Wax content

The wax content of the coated silicas is determined by solvent extraction using the Tecator Soxhlet HT2. A known weight of sample is transferred to the "thimble" on the apparatus and extracted with 70 mls of chloroform at reflux for 20 minutes. The thimble is rinsed for 45 minutes, air blown for 5 minutes, removed from the equipment and dried in an air circulated oven at 105° C. for 15 mins. The wax content (in % w/w) can be calculated from the weight difference to constant weight.

SPECIFIC DESCRIPTION OF THE INVENTION

The invention is further illustrated but not limited by the following examples in which parts and percentages are by weight, unless otherwise indicated.

In all the examples two basic feedstocks have been utilised, one based on a precipitate or stirred vessel route (A), and the other a conventional high porosity gel (B).

FEEDSTOCK A

This silica was prepared using the method disclosed in EP A 0361 622 Example 1 (Run 1; Table 1) but before filtration and washing the slurry was aged at pH 7.0 for 2 hours at 80° C. After washing the aged hydrogel was then flash dried.

FEEDSTOCK B

This material was made utilising the procedures disclosed in EPA 0377 301 but the silica hydrogel, after washing was aged at pH 7.0 for 6 hours at 80° C. The aged hydrogel was then flash dried.

The properties of the two silica feedstocks are given in Table 1.

TABLE 1

Properties of Feedstocks

| Sillica Feedstock | Surface Area $m^2g^{-1}$ | Pore Volume $cm^3g^{-1}$ | Oil Absorption g/100 g | Weight Mean Particle Size μm |
|---|---|---|---|---|
| A | 420 (b) | 1.7 (b) | 220 (b) | 60 |
| B | 320 (b) | 1.8 (b) | 230 (b) | 200/300 (a) |

(a) Estimated from sieve separation
(b) Mean results from 5 samples

EXAMPLE 1

Comparison

A number of potential waxes and wax blends were screened for their ability to provide the desirable features of improved settlement, and better compatibility, when coated onto a suitable silica.

Feedstock (A) or (B) was mixed with the candidate waxes or wax blends (prepared by mixing the melted waxes, allowing them to cool and then milling) so that the resultant silica/wax mixture contained between 8 to 12% w/w of the wax or wax blend.

This blend of silica and wax was then fed to an AFG 200 fluid bed mill (supplied by Alpine AG, Augsburg, Germany), operating at an air inlet temperature of 180° C., the classifier speed and feed rate being set commensurate with obtaining a micronised product with a weight mean particle size in the range 5 to 9 microns.

The wax coated silicas were subjected to the following measurements:
 i. Matting efficiency
 ii. Accelerated settlement 70° C.
 iii. Polyurethane gelling test.

The results of these selection tests are summarised in Table II, together with properties of the micronised products. Clearly none of the prior art materials provide the necessary enhancement in either settlement behaviour or compatibility, though the micronised product containing the wax blend 10 polyethylene (MW 2000): 90 microcrystalline did offer improved performance in accord with the teaching of U.S. Pat. No. 4,097,302.

TABLE II

| | | MICRONISED PRODUCT PROPERTIES | | |
|---|---|---|---|---|
| TEST/FEEDSTOCK | LITERATURE | Weight Mean Particle Size | TVM | WAX |

TABLE II-continued

| TYPE | WAX/WAX BLEND | SOURCE | μm | % w/w | % w/w |
|---|---|---|---|---|---|
| 1/B | Synthetic Polyethylene MW 500 | — | 6.5 | 17.4 | 9.3 |
| 2/B | Microcrystalline | GB 798,621 | 6.5 | 17.2 | 9.6 |
| 3/A | Microcrystalline | GB 798,621 | 6.0 | 15.2 | 9.3 |
| 4/B | 25 Polyethylene (MW 500) 75 Microcrystalline | US 4,097,302 | 5.8 | 16.0 | 9.7 |
| 5/A | 25 Polyethylene (MW 500) 75 Microcrystalline | US 4,097,302 | 5.5 | 17.2 | 9.5 |
| 6/A | 10 Polyethylene (MW 2000) 90 Microcrystalline | US 4,097,302 | 7.0 | 13.5 | 8.0 |
| 7/B | Montan acid Ester | GB 1,538,474 | 7.9 | 18.0 | 10.6 |

| TEST | MATTING EFFICIENCY 60° | 85° | NATURE OF SEDIMENT/TIME ALKYD UREA 70° C. | INTERACTION WITH POLYURETHANE CONCENTRATE ROOM TEMPERATURE |
|---|---|---|---|---|
| 1 | 22 | 38 | Soft sediment up to 7 days | Thickened over 24 hours - Gelled after 3 days |
| 2 | 21 | 40 | Hard sediment 24 hours | Irreversible gelling within 6 hours |
| 3 | 22 | 42 | Hard sediment 24 hours | Irreversible gelling within 6 hours |
| 4 | 20 | 42 | Hard sediment 24 hours | |
| 5 | 19 | 44 | Hard sediment 24 hours | |
| 6 | 20 | 27 | Hard sediment 6 days | Thickened over 24 hours |
| 7 | 19 | 32 | Hard sediment 2 days | Irreversible gelling after 24 hours |

MW = Molecular Weight
TVM = total volatile material and includes the wax

The performance of the micronised silica containing the polyethylene wax (MW 500) is interesting, because at room temperature a hard sediment formed at 24 hours, whereas at 70° C. a soft sediment has been observed up to 7 days. All the other materials gave rise to soft sediments when stored in alkyd urea for up to 2 months at room temperature.

EXAMPLE 2

Following the procedure for the preparation of the wax coated silicas described in Example 1, a range of wax blends were vetted as a possible coating for the base silica feedstocks A and B, they included:
Plasticising microcrystalline wax Victory®;
Hard microcrystalline - Crown® 700 and Cerit® HOT.
Synthetic polyethylene wax's (MW 500, and 2000) Polywax® 500 and Polywax® 2000

The waxes were blended together in the molten state, cast and then granulated and pin milled. They were then mixed with the appropriate silica feedstock and fluid energy milled. The micronised silicas containing the wax blends made from the above waxes were subjected to the same testing programme as that carried out on the products of Example 1. The results are summarised in Table III together with the properties of the micronisedproducts. Samples I, II, X, XI and XII are comparative examples.

It can be seen that the micronised product containing the ternary blends, consisting of hard microcrystalline wax as the base and differing levels of plasticising microcrysta, line wax and synthetic polyethylene wax (MW 2000), offer improved performance in terms of settlement behaviour and compatibility. All the products gave rise to soft sediments when stored in alkyd urea for up to 1 month at room temperature.

From the above data and from general experience with the compositions the ternary wax blend gives superior results as a matting agent with respect to minimising interference with the lacquer system, when applied to the same silica feedstock either precipitate or gel derived using similar conditions in the comicronising process. The preferred ternary blend contains 75±10% hard microcrystalline wax, 15±5% plasticising microcrystalline wax, and 10±5% synthetic polyethylene wax.

TABLE III

| TEST/FEEDSTOCK TYPE | WAX BLEND COMPOSITION | | | MICRONISED PRODUCT PROPERTIES | | |
|---|---|---|---|---|---|---|
| | HARD MICRO. % W/W | MICROCRYST. PLASTIC WAX % W/W | POLYETHYLENE | WEIGHT MEAN PARTICLE SIZE μm | TVM % | WAX W/W % |
| I/A | 90 (Cr) | 10 | — | 6.6 | 14.7 | 8.5 |
| II/A | 80 (Cr) | 20 | — | 6.9 | 14.0 | 8.3 |
| III/A | 85 (Cr) | 5 | 10 (P2) | 6.4 | 16.4 | 9.3 |
| IV/A | 80 (Cr) | 10 | 10 (P2) | 8.2 | 18.4 | 10.0 |
| V/A | 70 (Cr) | 20 | 10 (P2) | 6.8 | 15.8 | 9.0 |
| VI/A | 60 (Cr) | 30 | 10 (P2) | 6.6 | 14.5 | 8.5 |
| VII/A | 80 (Ce) | 10 | 10 (P2) | 6.6 | 14.8 | 8.5 |
| VIII/B | 80 (Ce) | 10 | 10 (P2) | 6.7 | 17.3 | 9.5 |
| IX/A | 80 (Cr) | 10 | 10 (P5) | 7.0 | 15.5 | 9.0 |

TABLE III-continued

| | | | | | | | |
|---|---|---|---|---|---|---|---|
| X/A | 90 (Ce) | — | 10 (P2) | | 6.3 | 15.0 | 8.7 |
| XI/A | 90 (Ce) | — | 10 (P5) | | 6.2 | 17.0 | 9.3 |
| XII/A | — | 50 | 50 (P5) | | 6.2 | 13.8 | 8.0 |

| TEST | MATTING EFFICIENCY 60° | MATTING EFFICIENCY 85° | NATURE OF SEDIMENT/TIME ALKYD UREA 70° C. | INTERACTION WITH POLYURETHANE CONCENTRATE ROOM TEMPERATURE |
|---|---|---|---|---|
| I | 22 | 38 | Hard sediment 24 hours | |
| II | 21 | 25 | Hard sediment 24 hours | Thickened slightly no gelling |
| III | 18 | 33 | Soft sediment up to 7 days | |
| IV | 23 | 25 | Soft sediment up to 14 days | Thickened slightly no gelling up to 3 weeks |
| V | 20 | 37 | Soft sediment up to 7 days | |
| VI | 17 | 29 | Hard sediment in 7 days | Slight thickening no gelling |
| VII | 19 | 33 | Soft sediment up to 14 days | Thickened slightly no gelling up to 3 weeks |
| VIII | 18 | 35 | Soft sediment up to 14 days | Thickening slightly no gelling up to 3 weeks |
| IX | 18 | 28 | Hard sediment 24 hours | |
| X | 18 | 33 | Hard sediment 6 days | |
| XI | 19 | 32 | Hard sediment 24 hours | |
| XII | 19 | 33 | Hard sediment 24 hours | |

Cv = Crown 700  P5 = Polywax 500
Ce = Cerit HOT  P2 = Polywax 2000

We claim:

1. Wax coated amorphous silica matting agent characterised in that the wax coating is present in the range from about 5% to about 20% by weight of the matting agent and comprises
   i. from about 50% to about 90% by weight of a hard microcrystalline wax,
   ii. from about 5% to about 30% by weight of a plasticising microcrystalline wax, and
   iii. from about 5% to about 20% by weight of a synthetic polyethylene wax.

2. A wax coated silica according to claim 1 wherein the silica is a xerogel or a precipitated silica.

3. A wax coated silica according to claim 2 wherein the silica has a surface area to nitrogen of from 200 to about 550 $m^2g^{-1}$ and a pore volume of from about 0.8 to about 2.5 cc / g.

4. A wax coated silica according to claim 1, 2 or 3 wherein the wax content of the agent is up to about 15% by weight.

5. A wax coated silica according to claim 1, 2 or 3 wherein the hard microcrystalline wax forms form about 65% to about 85% by weight of the wax coating.

6. A wax coated silica according to claim 1, 2 or 3 wherein the plasticising microcrystalline wax forms from about 10% to about 20% by weight of the wax coating.

7. A wax coated silica according to claim 1, 2 or 3 wherein the synthetic polyethylene wax forms from about 5% to about 15% by weight of the wax coating.

8. A wax coated silica according to claim 1, 2 or 3 having a weight mean particle size in the range from 5 to about 9 micron.

9. A surface coating composition comprising from about 2% to about 10% by weight of wax coated silica claimed in claim 1, 2 or 3.

10. A method of preparing a wax coated silica according claim 1, 2 or 3 wherein the components of the wax coating are blended by melting, milled to a particle size comparable with the amorphous silica, mixed the silica in an amount of about 5% to about 20% by weight of the mixture which is then milled in a fluid energy mill to provide a wax coated silica product.

* * * * *